US012445721B1

(12) United States Patent
Kumar et al.

(10) Patent No.: US 12,445,721 B1
(45) Date of Patent: Oct. 14, 2025

(54) DETERMINING OPTIMAL CAMERA SETTINGS

(71) Applicant: Zoox, Inc., Foster City, CA (US)

(72) Inventors: Anil Kumar, Castro Valley, CA (US); Sasidhar Saladi, Fremont, CA (US)

(73) Assignee: Zoox, Inc., Foster City, CA (US)

( * ) Notice: Subject to any disclaimer, the term of this patent is extended or adjusted under 35 U.S.C. 154(b) by 109 days.

(21) Appl. No.: 18/390,858

(22) Filed: Dec. 20, 2023

(51) Int. Cl.
*H04N 23/667* (2023.01)
*G06T 7/80* (2017.01)
*G06T 7/90* (2017.01)

(52) U.S. Cl.
CPC ............. *H04N 23/667* (2023.01); *G06T 7/80* (2017.01); *G06T 7/90* (2017.01); *G06T 2207/10004* (2013.01)

(58) Field of Classification Search
CPC ........... H04N 23/667; G06T 7/80; G06T 7/90; G06T 2207/10004; G06T 7/0004; G06T 2207/30252; G06V 20/56; G06V 20/59
See application file for complete search history.

(56) References Cited

U.S. PATENT DOCUMENTS

| 11,428,541 | B1* | 8/2022 | Khalili | G01C 25/005 |
|---|---|---|---|---|
| 2014/0176726 | A1* | 6/2014 | Millward | G01C 11/02 |
| | | | | 348/169 |
| 2016/0200264 | A1* | 7/2016 | Bingle | H04N 23/57 |
| | | | | 348/148 |
| 2017/0010155 | A1* | 1/2017 | Ritter | G01J 3/0297 |
| 2017/0180724 | A1* | 6/2017 | Russell | G06T 7/30 |
| 2018/0067198 | A1* | 3/2018 | Valois | G01S 17/08 |
| 2019/0289174 | A1* | 9/2019 | Ishii | H04N 23/67 |
| 2021/0199479 | A1* | 7/2021 | Lau | G01S 13/931 |
| 2022/0358679 | A1* | 11/2022 | Chen | G06T 7/73 |
| 2024/0062552 | A1* | 2/2024 | Meertens | G06V 10/774 |

* cited by examiner

*Primary Examiner* — Chiawei Chen
(74) *Attorney, Agent, or Firm* — EIP US LLP

(57) ABSTRACT

Techniques are provided comprising illuminating a camera test target according to a first light setting associated with an ambient light condition experienced by a vehicle traversing an environment; determining, based at least in part on the first image and on a known characteristic of the camera test target, a first image quality indicator; and determining, based at least in part on the first image quality indicator, a first image processor setting associated with the first light setting. Respective image processor settings can be determined for each of multiple ambient light conditions. The image processor settings may be transmitted to a vehicle controlled based at least in part on an ambient light detection associated with the environment through which the vehicle is traversing being associated with the first light setting or the second light setting.

20 Claims, 6 Drawing Sheets

DETERMINING OPTIMAL CAMERA SETTINGS

BACKGROUND

Various systems, such as autonomous vehicles, may rely on sensor data for operation (e.g., when an autonomous vehicle navigates through an environment based at least in part on images captured by one or more onboard cameras). Such cameras may comprise a sensor generating an image signal, and an image processor for generating a processed image based on the image signal. The image processor may process an image according to one or more image processor settings, for example relating to exposure, contrast, white balance, and the like. If such settings are not correct, important information may not be detected in the sensor data and, for example in the case of autonomous vehicles, may result in unsafe or less than ideal behavior.

BRIEF DESCRIPTION OF DRAWINGS

The detailed description is described with reference to the accompanying figures. The use of the same reference numbers in different figures indicates similar or identical components or features.

DETAILED DESCRIPTION

Figure 1:
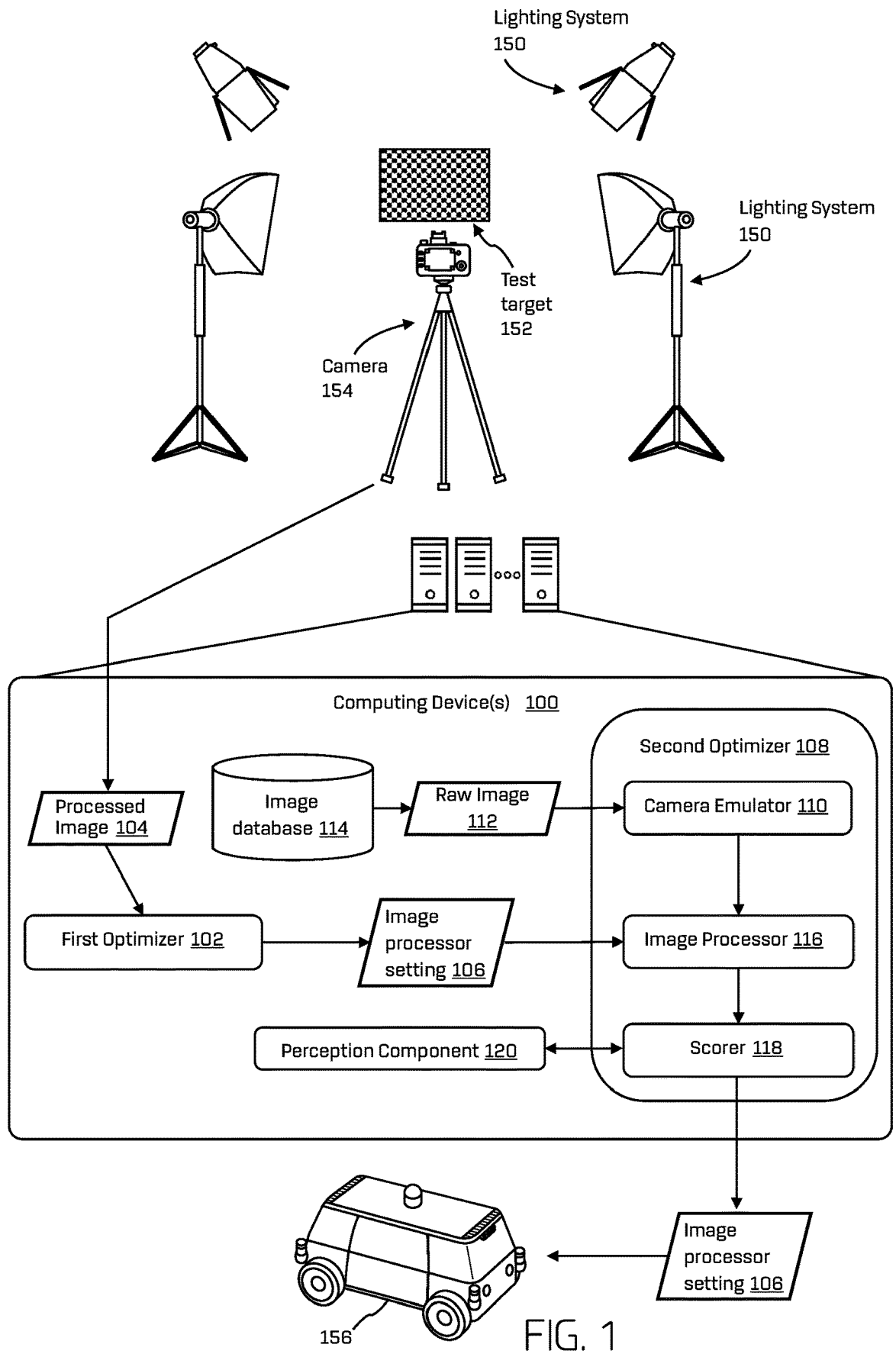
FIG. 1 is schematically illustrates a computing device which may implement techniques according to the present disclosure, with example illustrations of camera test apparatus.

Techniques of the present disclosure provide automated mechanisms for determining image processor settings for a camera. The techniques may allow different image processor settings to be generated for different light conditions, for example allowing a vehicle to select an optimum set of image processor settings for a current ambient light condition it is experiencing. Such optimum settings may improve the quality of the image provided to the vehicle control systems in a given light condition and/or may allow the vehicle control systems to more accurately interpret the environment around the vehicle and, thus, improve vehicle control (e.g., improving safety of the vehicle controls). Further, the techniques may provide a two-step optimization process. In a first step, image processor settings may be optimized based on images of a test target illuminated with controlled lighting. In a second step, labelled raw image signals may be processed according to the image processor settings determined in the first step, yielding a processed image that may be equivalent to the image an onboard vehicle camera would generate. This processed image may be provided to a perception component, which may be the same perception component as used on-vehicle to interpret captured images and other sensor data. The ability of the perception component to accurately classify objects in the processed image (compared to the known labels for those objects) may be assessed and used to further refine the image processor settings. Thus, techniques of the present disclosure may provide an automated way of testing and optimizing image processor settings that accounts for how images are used onboard a vehicle to determine vehicle controls.

Some techniques may comprise receiving a first image of a camera test target, the first image captured by a test camera while the camera test target is illuminated according to a first light setting associated with a first ambient light condition experienced by a vehicle traversing an environment. The first light setting may represent the setting(s) of a test lighting system which recreates, or approximates, the first ambient light condition in a test setting. The first ambient light condition may be, may comprise, or may be represented by a light spectrum representing the spectrum of ambient light associated with the first ambient light condition. The techniques may comprise determining, based at least in part on the first image and on a known characteristic of the camera test target, a first image quality indicator; and determining (e.g., by optimization), based at least in part on the first image quality indicator, a first image processor setting associated with the first light setting. The techniques may further comprise receiving a second image of the camera test target, the second image captured by the test camera while the camera test target is illuminated according to a second light setting associated with a second ambient light condition experienced by a or the vehicle traversing the environment; determining, based at least in part on the second image and on a known characteristic of the camera test target, a second image quality indicator; determining (e.g., by optimization), based at least in part on the second image quality indicator, a second image processor setting associated with the second light setting; and transmitting the first image processor setting and the second image processor setting to a or the vehicle, the vehicle controlled based at least in part on images from a vehicle camera configured according to the first image processor setting or the second image processor setting based at least in part on a current ambient light condition experienced by the vehicle being associated with the first light setting or the second light setting. As will be appreciated, further image processor settings may be determined in a similar manner for further light settings associated with further ambient light conditions experienced by a or the vehicle. Thus, a set of image processor settings, each relating to a different light setting may be transmitted to the vehicle. For example, the set of image processor settings may comprise settings for at least five different light settings, or at least ten different light settings. In operation, the vehicle may determine the current ambient light conditions, and select an appropriate image processor setting. In contrast to conventional manual methods, such techniques may provide a fast, objective mechanism for determining optimum vehicle image processor settings. As a result, image processor settings may be determined for a wider range of light conditions than in conventional techniques, allowing on-vehicle image processing to be more finely tailored to ambient conditions. This may improve the quality of images provided to the vehicle control systems, particularly in difficult lighting conditions such as very bright sun, very dark, or entering/exiting a tunnel.

In some examples, the first image quality indicator or the second image quality indicator may be or comprise one or more of: a measure of glare, a contrast, a color accuracy, a sharpness, or tonal response, object detection, localization (including sizing), or a temporal response. The first image processor setting or the second image processor setting may be associated with one or more of: exposure, white balance, artificial image sharpening, contrast, saturation, noise reduction, vibrance, hue, gamma correction, or color balance.

Some such techniques may comprise further refining the first and/or second image processor setting. Some examples may comprise receiving a raw image signal, for example from a database of raw images. The raw image signal may represent a raw image comprising at least a first object. The raw image signal may for example be, comprise, or represent a real-world scene, for example as captured by a camera on a vehicle. The raw image signal may represent a difficult driving scene, such as, in non-limiting examples, scenes with intense sunlight, a combination of dark areas and bright areas, or transitions between one type of light condition and another (e.g., entering or exiting a tunnel). Such examples may comprise generating, using a camera emulator, an emulated camera output based at least in part on the raw image signal. The camera emulator may be implemented on configurable hardware, such as an FPGA, or in software. The camera emulator may be configured to replicate the operation of a vehicle camera. In particular, the camera emulator may be configured to generate an emulated camera output from the raw image signal that replicates the sensor signal that would be generated by the sensor of a vehicle signal viewing the scene represented in the raw image signal. Such examples may further comprise generating, using an image processor configured based at least in part on the first (or second) image processor setting determined as above, a processed image based at least in part on the emulated camera output. The image processor may be associated with the image processor of a vehicle camera (e.g., may be the same type/model). The processed image generated by the image processor may thus represent the processed image that would be output by a vehicle camera viewing the scene represented in the raw image signal, if the camera's image processor had been configured according to the first image sensor setting. In some examples, the emulated camera output may be provided as an input to a perception component, the perception component associated with a vehicle control system. Here, the perception component may replicate the operations of a vehicle perception component but may be implemented on a computer system external to a vehicle (e.g., on the same computer system performing the present techniques). A vehicle perception component may be or comprise one more models configured (e.g., trained) to detect or classify objects in sensor data or other representations of the environment captured by the vehicle's onboard sensor systems. The perception component may be configured to provide information about objects in the environment around the vehicle (e.g., detections, classification, segmentations, instance segmentations, predictions, track and/or state information, velocity estimations, etc.) to further control components, such as a prediction component or planning component, so that the vehicle control system can plan routes through the environment accounting for objects in the environment. Similarly, the (test) perception component here may detect or classify objects in the processed image(s) received from the image processor. Thus, some examples of the present techniques may comprise identifying, by the perception component, the first object as represented in the processed image. Some examples may comprise transmitting the first (and/or second) image processor setting to the vehicle based at least in part on identifying, by the perception component, the first object.

In such some examples, the ability of the perception module to identify the first object (and any other objects represented in the raw image signal) may be used as a test to verify that the first (and/or second) image processor setting yields images of sufficient quality to be used by a vehicle perception component. For example, a object score may be determined representing the ability of the perception component to correctly classify the first object. If the object score meets a predetermined threshold, the first (and/or second) image processor setting may be transmitted to the vehicle. In other examples, the object score may be used to further optimize the first (and/or second) image processor setting. For example, an optimization routine may comprise iteratively adjusting the first (and/or second) image processor setting based at least in part on the object score, generating a new processed image based on the raw image signal, passing the new processed image to the perception component, and generating a new object score. In some examples such an optimization routine may be performed until the object score meets a predetermined threshold. Once optimized, the first (and/or second) image processor setting may be transmitted to the vehicle.

Thus, some techniques of the present disclosure may further refine the image processor settings based on how images may be used on the vehicle, i.e., processed by a perception component to identify objects around the vehicle represented in the camera images during driving through an environment. Thus, such techniques may yield improved image processor settings, determined objectively, for the particular perception component used on-vehicle. Thus, such techniques may improve vehicle control, e.g., safety of vehicle control.

Some techniques may comprise determining image processor settings for various lighting conditions. For example, some examples may comprise receiving a plurality of light spectra associated with ambient light conditions experienced by vehicles traversing environments as well as the associated image processor settings. In some examples the light spectra may be recorded by sensors on vehicles, for example an onboard spectrometer. The techniques may comprise determining the first light setting and the second light setting based at least in part on the plurality of light spectra. For example, the techniques may comprise identifying a first light spectrum and a second light spectrum in the plurality of light spectra; and determining the first light setting and the second light setting based at least in part on the first light spectrum and the second light spectrum respectively. For example, determining the first light setting and the second light setting may comprise determining the setting(s) of a test lighting system that recreates or approximates the respective light spectra in a test setting. Some examples may comprise determining the first and second light settings based at least in part on a clustering of the light spectra received. For example, the techniques may comprise identifying, using a clustering algorithm, a first cluster of light spectra and a second cluster of light spectra in the plurality of light spectra. The first light setting and the second light setting may then be determined based at least in part on the first cluster of light spectra and the second cluster of light spectra respectively, for example based on respective light spectra representing the respective clusters (e.g., a cluster centroid). In some examples, such clusters may be determined based on a set of observations in the data provided representative of different times of day, times of year, geographic locations, weather conditions, and other phenomena that impact light spectra during driving or otherwise received. As such, clusters may be determined so as to have a representative set of a wide variety of lighting conditions while driving. Thus, in such examples, the techniques may automatically determine light settings to test that are representative of clusters of light spectra within the set, which may limit the burden of testing large numbers of light settings while still yielding a representative selection of light settings to improve on-vehicle imaging in a wide variety of ambient light conditions. In examples, the clustering algorithm may determine a representation of each light spectrum in the set of light spectra (e.g., a multidimensional vector representing spectrum intensity at each of a set of frequency bins, or a representation determined by a trained embedding algorithm) and may identify clusters based on those representations. The clustering algorithm may be any suitable clustering algorithm, such as a K-means clustering algorithm or hierarchical clustering algorithm, or agglomerative clustering algorithm.

Some examples may comprise controlling a test lighting system to illuminate the camera test target according to the first light setting or the second light setting. The light system may comprise one or more light sources, for example each capable of emitting a different spectrum of light. Some examples may comprise receiving, from a spectrometer, a signal representing the light output by the lighting system; and controlling the lighting system based at least in part on the signal representing the light output by the lighting system. Thus, the techniques of the present disclosure may dynamically control the lighting system to maintain a stable illumination during optimization of image processor settings, ensuring that the image processor settings are accurately optimized for the intended light setting.

Some techniques may comprise operations of the vehicle control system(s) after the image processor settings have been transmitted. For example, some examples may comprise determining, by a control system of the vehicle or otherwise, the current ambient light condition experienced by the vehicle. The determination may be based at least in part on a light condition detected by a vehicle sensor (e.g. an onboard spectrometer), and/or based at least in part on a time of day, time of year, and/or current location of the vehicle. For example, from the time of day and location it may be determined whether the ambient conditions are (in non-limiting examples) sunrise, twilight, sunset, or nighttime conditions. The examples may further comprise configuring, by the control system of the vehicle, the vehicle camera (or the image processor of or associated with the vehicle camera) according to the first image processor setting or the second image processor setting based at least in part on the current ambient light condition. In other words, the vehicle may select (e.g. from a look-up table) the most appropriate image processor setting for the current ambient light conditions. In some examples, the value of the image processor settings may be interpolated (e.g., bilinear or cubic) between multiple settings, a closest setting may be used, or the like. Such example may then comprise controlling, by the control system of the vehicle, the vehicle based at least in part on images generated by the vehicle camera.

Although described above in terms of a first image processor setting associated with the first light setting and a second image processor setting associated with the second light setting, it is to be appreciated that multiple different image processor settings may be determined for each light setting. Thus, examples may comprise determining a first set of image processor settings and a second set of image processor settings and transmitting each set to the vehicle. Each image processor setting of a set of image processor settings may be determined in the same way as described above, for example by initially optimizing each image processor setting based on an image of the test target, and optionally further optimizing each image processor setting using the emulated camera and perception component as described above.

In some examples, the camera test target may comprise one or more regions having known optical characteristics, each region associated with one or more image quality indicators. In a non-limiting example, the target may comprise a first region associated with color accuracy (e.g., having a color test chart of known color characteristics), a second region associated with contrast (e.g., having a contrast checkerboard), and/or any number of additional regions for measuring additional optical properties. In such examples, multiple image quality indicators may be determined based on the same image of the test target, which may in turn allow multiple image processor settings to be optimized concurrently. Such techniques may this provide an efficient mechanism for optimizing multiple image processor settings for a given light condition.

Some techniques may comprise receiving a first processed image of a camera test target, the first processed image captured by a test camera while the camera test target is illuminated according to a first light setting; determining, based at least in part on the first processed image and on a known characteristic of the camera test target, a first image quality indicator; optimizing, based at least in part on the first image quality indicator, a first image processor setting associated with the test camera; receiving a first raw image, the first raw image comprising a first object; generating, using a camera emulator, an emulated camera output based at least in part on the first raw image; generating, using an image processor configured based at least in part on the first image processor setting, a second processed image based at least in part on the emulated camera output; determining, using a vehicle perception component, a first classification of the first object in the processed image; determining, based at least in part on the first classification of the first object and a predetermined label associated with the first object, a first object score; optimizing, based at least in part on the first object score, the first image processor setting; and transmitting the first image processor setting to a vehicle camera of a first vehicle controlled based at least in part on images generated by the vehicle camera in accordance with the first image processor setting. In various examples, generation of the emulated camera output may form an image a camera would generate based on the raw data provided given various internal parameters and settings within a camera other than the ISP.

Techniques of the present disclosure may therefore provide improved mechanisms for determining the image processor settings that configure vehicle cameras, particularly vehicle cameras which inform control of autonomous or semi-autonomous vehicles. The techniques may improve vehicle performance and/or safety, for example by tailoring vehicle camera settings to particular ambient light conditions, which may yield clearer representations of greater parts of the environment surrounding the vehicle even in difficult light conditions. This may improve the ability of the vehicle control systems to safely navigate the vehicle through an environment, even in difficult light conditions.

FIG. 1 illustrates an example computing device(s) 100 which may be used to implement techniques of the present disclosure. The computing device(s) 100 may implement a method, such as method 200 and/or method 300 discussed below. The computing device(s) 100 may comprise a number of components, such as a first optimizer 102 and second optimizer 108. These components may be dedicated computational components or may represent logical blocks of software operated on computing device(s) 100. Although illustrated as part of the same computing device(s) 100, any of the components discussed in relation to computing device(s) 100 may be implement on separate computing device(s), for example remote from computing device(s) 100.

As discussed further below, and as illustrated in FIG. 1, computing device(s) 100 may receive one or more images of a test target 152, as captured by a test camera 154. The test camera 154 be associated with a vehicle camera of a vehicle 156. For example, the test camera 154 may be the same type/model as the vehicle camera or may otherwise be configured similarly to the vehicle camera. The test target 152 may comprise one or more regions, each associated with known optical properties. When an image of the test target 152 is captured by the test camera 154, the representations of the one or more regions of the test target 154 in the image may be compared to the known optical properties of the test target 154. In particular, one or more image quality indicators may be determined for the image, each representing a comparison of a feature represented in the image to the known optical characteristic(s) of the corresponding feature in the test target 152. In various examples, such a test target may comprise one or more of real data captured by a camera in a physical environment or may be a simulated image. In the event the image is captured from a real environment, the raw image data may be used and/or the image processor settings associated with the capture may be used to determine impact of changes to the settings. If simulated, simulated raw data may be output and/or determined such that the ambient lighting conditions will accurately mimic an anticipated environment.

In additional or alternate examples, the test target 152 may comprise a color test chart comprising elements with a known specific color. The corresponding colors of the elements in the image may be compared to the known real color, and a color reproduction error may be determined. For example, the color reproduction error may be a Delta C00 error. The color reproduction error may be considered an image quality indicator.

The test target 152 may comprise fixed contrast elements, such as one or more contrast checkerboards and/or a Siemens star target. A contrast metric, e.g., a Michelson contrast, may be determined by comparing contrast in the image to the known contrast of the target elements. The contrast metric may be considered an image quality indicator.

The test target 152 may comprise a glare detection area, comprising a light trap illuminated with a narrow, bright light source. A measure of the glare spread captured in the image may be considered an image quality indicator.

The test target 152 may comprise a texture resolution target, such as a Dead Leaf target. A texture resolution metric determined from the comparison of the image to the Dead Leaf target may be considered an image quality indicator.

The test target 152 may comprise image sharpness targets, such as slant edge targets. A measure of the sharpness of the corresponding parts of the image may be determined, such as a modulation transfer function or other sharpness metric may be considered an image quality indicator.

The test target 152 may comprise a tonal response target, such as an HDR (high dynamic range) target, which may be used to estimate to estimate a signal to noise ratio, dynamic range, and/or tonal response metric from the image any or all of which may be considered an image quality indicator(s).

The test target 152 may comprise an object, such as a representation of a pedestrian. The image quality indicator may be a classification of the object (e.g., can the objected be correctly identified, such as by a perception component as discussed below), a position of the object, a size of the object, or any other characteristic of the object (e.g., an identification of corners of the object). In general, the test target 152 may comprise features for determining localization, that is, how well the position, size, and/or orientation of the features in the captured image match the corresponding known features on the test target 152.

The test target 152 may comprise any other optical feature which can be used to derive an indicator of the image reproduction ability of the test camera 154. The test target 154 may comprise multiple targets, for example all or a subset of the targets listed above, which may allow multiple image quality indicators to be objectively obtained from a single image of the test target 152.

In some examples, the image quality indicator may be or comprise a temporal response. For example, the light illuminating the test target 152 may be changed (e.g., by shining a flash light onto the test target 152 or into the test camera 154), and the time taken for the test camera 154 to adjust to the changed light may be determined and used as an image quality indicator.

Each of the image quality indicators may be associated with one or more image processor settings of the test camera 154. That is, adjusting an image processor setting may alter the value of the associated image quality indicator of the image. Image processor settings may for example include one or more of: exposure, white balance, artificial image sharpening, contrast, saturation, noise reduction, vibrance, hue, gamma correction, or color balance. The image quality indicator(s) determined from an image of the test target 152 may provide objective and qualitative metrics for determining optimized image processor settings.

As further illustrated in FIG. 1, the test target 152 may be illuminated by a lighting system 150. The lighting system 150 may comprise one or more light sources configured to collectively create an illumination associated with an ambient light condition experienced by a vehicle traversing an environment. In non-limiting examples, the illumination may be, or approximate, sun rise, sunset, twilight, nighttime with streetlamps, or any other lighting condition that may be experienced by a vehicle in operation. As discussed further in relation to FIG. 4, the lighting system 150 may be controlled according to a lighting setting, which for example may specify intensity levels of each of the light sources in order to create a desired spectrum of illumination at the test target 152.

Returning to computer device(s) 100, computer device(s) 100 may comprise first optimizer 102, which may receive a processed image 104, for example from the test camera 154. The processed image 104 may be an image that has been captured by a sensor of the test camera 154, and then processed by an image processor of the test camera 154, for example processed according to one or more initial image processor settings. In some examples, the first optimizer 102 may receive a processed image 104 from an image database, for example stored in memory associated with the computer device(s) 100. The first optimizer 102 may implement operations 202-206 illustrated in FIG. 2A.

Figure 2A:
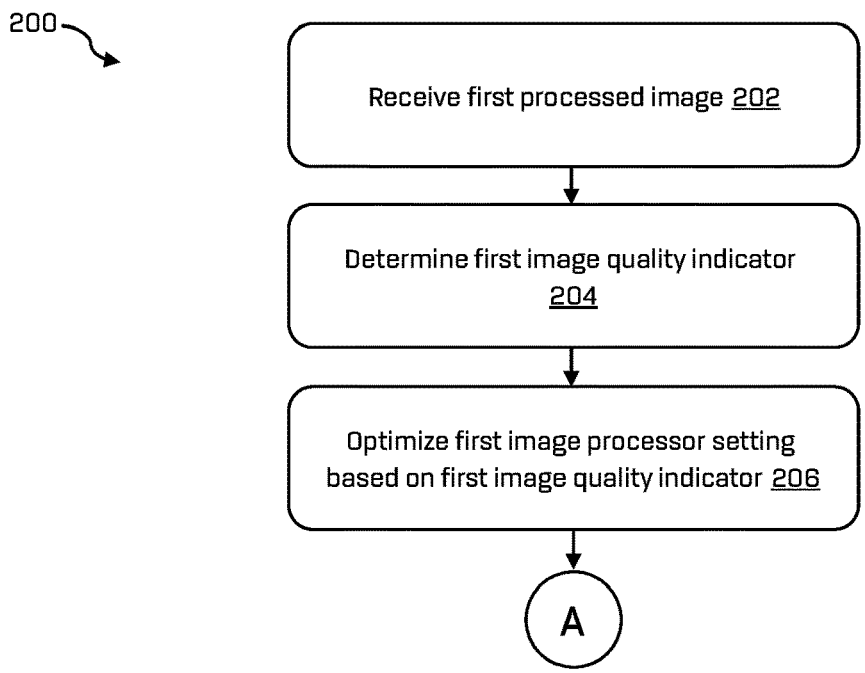
FIGS. 2A and 2B are flow charts illustrating an example a process according to techniques of the present disclosure.
Figure 2B:
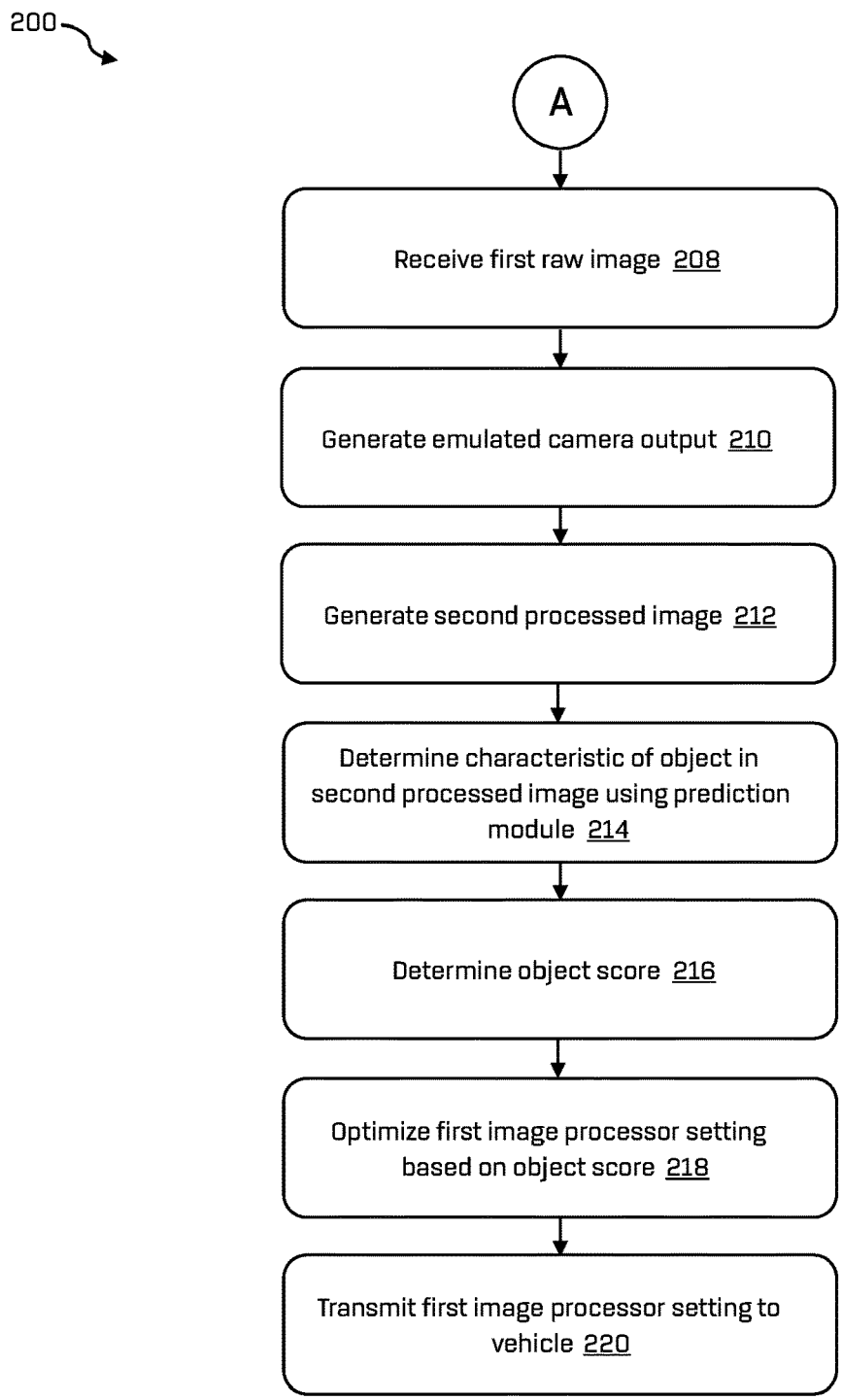

FIGS. 2A and 2B illustrate an example process 200 which may for example be performed by the computer device(s) 100. Process 200 may be implemented on a system comprising one or more processors and one or more non-transitory computer-readable media storing instructions that, when executed, perform the operations of process 200. Process 200 may be implemented as one or more transitory or non-transitory computer-readable media storing instructions executable by one or more processors, wherein the instructions, when executed, cause the one or more processors to perform the operations of process 200. Process 200 may be implemented as a computer program comprising instructions which, when executed by a computer device, cause the computer device to perform the operations of process 200.

As illustrated in FIG. 2A, process 200 may comprise operations 202-206, which may be considered a first optimization routine for determining a first image processor setting (or settings). As such, operations 202-206 may be performed by the first optimizer 102 of computing device(s) 100, or may be the logical operations forming the logical block represented by the first optimizer 102.

Operation 202 may comprise receiving a processed image 104 of the camera test target 162. The first processed image 104 may be captured by the test camera 154 while the camera test target 162 is illuminated according to a first light setting (e.g., by the lighting system 150). In some examples, process 200 may comprise an initial operation of illuminating the camera test target according to the first light setting.

Operation 204 may comprise determining, based at least in part on the processed image 104 and on a known optical characteristic of the camera test target 152, a first image quality indicator (or set of first image quality indicators). As discussed above, multiple image quality indicators may be determined, each corresponding to a different region of the test target 152 configured for generating qualitive measures of image quality. The first image quality indicator may for example represent a difference or other comparison between an actual appearance of a feature of the test target 154, and an apparent appearance of the same feature in the processed image 104.

Operation 206 may comprise optimizing, based at least in part on the first image quality indicator, a first image processor setting 106 associated with the test camera. Optimizing may for example comprise, iteratively: determining an updated value of the first image processor setting based at least in part on the first image quality indicator 106; receiving an updated processed image 104 captured based at least in part on the updated value of the first image processor setting 106; determining an updated first image quality indicator based at least in part on the updated first image 104; and determining a further updated value of the first image processor setting 106 based at least in part on the updated first image quality indicator. These steps may be repeated until a stop condition is met, for example a stop condition associated with the or a first image quality indicator. In some examples, the stop condition may be met if a first image quality indicator meets a predetermined threshold value. In some examples, optimizing may comprise performing a convex optimization algorithm, using one or more first image quality indicators as the cost function to be optimized.

In some examples, the first image quality indicator may be associated with a first weight. Operation 206 may comprise determining the first image processor setting based at least in part on the first weight. The first weight may be based at least in part on the first ambient light condition. For example, in some light conditions such as nighttime, it may be desired to optimize some image quality indicators (e.g., reducing halo), whereas indicators may be less important in that light condition. The weight may reflect the relative importance of that image quality indicator in the given light condition. Some image quality indicators may have an interdependence, where improving one indicator reduces they quality of another. Associating weights with the image quality indicators may allow optimization of important (for that light condition) indicators while allowing quality reductions in other indicators.

In some examples, once the one or more first image processor settings 106 have been determined by this first optimization process, the first image processor settings 106 may be transmitted to a vehicle 156 for use in configuring one or more vehicle cameras during operation of the vehicle. In examples such as that illustrated in FIG. 1, however, a second optimization process may be performed, as represented by the second optimizer 108 of the computing device(s) 100. The second optimizer 108 may perform, or may represent logical blocks comprising, operations 208-218 of process 200, illustrated in FIG. 2B. The second optimizer 108 may test the first image processor setting(s) 106 from the first optimizer 102 by testing how well a perception component 120 (corresponding to a perception component 120 onboard vehicle 156) can perceive objects in images generated according to the first image processor setting(s) 106.

Operation 208 may comprise receiving a first raw image 112, for example from an image database 114. The image database may be stored in memory within or associated with the computing device(s) 100. As used herein, a raw image may be or comprise an unprocessed and/or uncompressed image file that contains substantially all of the information captured by a camera sensor, i.e., before the image is processed by an image processor. The first raw image 112 may be an image captured by a vehicle (e.g., by a camera on a vehicle such as vehicle 156) while the vehicle traverses an environment and transmitted to the computer device(s) 100. The first raw image 112 may comprise at least a first object, for example a first agent (e.g., another vehicle in proximity to the vehicle camera). The first object in the first raw image 112 may be associated with a label identifying the first object. For example, the label may identify a classification of the first object (e.g., vehicle, pedestrian, etc.). The label may be stored in the image database 114, or other memory associated with the computing device(s) 100 and may be linked to the first raw image 112. The label may be generated by a computer vision algorithm or may be generated based on user input.

In some examples, process 200 may comprise operation 210. Other examples may omit operation 210, and may proceed to operation 214 based on the received first raw image. Operation 210 may comprise generating, using a camera emulator 110, an emulated camera output based at least in part on the first raw image 112. The camera emulator 110 may be implemented on configurable hardware, such as an FPGA, or may be implemented in software. The camera emulator may emulator the behavior of a camera sensor, and in particular may emulate a camera sensor of a vehicle camera on vehicle 156. For example, the first raw image 112 may comprise a machine-readable signal representing the output of a camera sensor (before processing by the associated image processor). The first raw image 112 may generally be an unprocessed image or representation of an environment. The first raw image 112 may be captured by a camera in a real-world environment (for example associated with known ambient light conditions), and may be stored in memory until used in process 210. The camera emulator 110 may receive the first raw image 112 and may generate an emulated camera output such as a sensor signal. A sensor signal output by a camera sensor and provided to an image processor may generally have a standardized format, for example a Mobile Industry Processor Interface (MIPI) format, though any other format is contemplated including, but not limited to Gigabit Multimedia Serial Link (GMSL), USB, or otherwise. The camera emulator 110 may convert the first raw image 112 into the standardized format. Thus, the output of the camera emulator 110 may reflect the signal that a real camera sensor would output to an image processor based on detecting a scene as represented in the first raw image 112. In other words, the first raw image 112 acts as an input representing a real-world scene viewed by a camera, and the emulated camera output represents the sensor output, e.g., the MIPI signal that would be passed to an image processor in the real camera.

Operation 212 may comprise generating, using an image processor 116 configured based at least in part on the first image processor setting(s) 106, a second processed image based at least in part on the emulated camera output. Here, the image processor 116 may be a real image processor connected to or otherwise associated with the computing device(s) 100. In other examples, the image processor 116 may be emulated, similarly to the emulated on the camera sensor by camera emulator 110. The image processor 116 may be associated with on-vehicle image processor part of or associated with a vehicle camera of vehicle 156. For example, the image processor 116 may be the same type or model as the vehicle image processor. The image processor 116 may be configured according to the first image processor setting(s) 106 determined in the first optimization operation. For example, if the first image processor setting(s) 106 comprise a value for a white balance setting, the white balance of the image processor 116 may be set to have that value. The second processed image generated by the image processor 116 may therefore represent the processed image that would be generated by a vehicle camera system viewing the scene represented in the first raw image 112, if the camera's image processor had been configured according to the first image processor setting(s) 106.

Operation 214 may comprise determining, using a perception component 120, a first characteristic or classification of the first object in the second processed image. The perception component 120 may be associated with a vehicle perception component, i.e., a vehicle perception component that is part of the control systems of a vehicle such as vehicle 156. For example, the perception component 120 may implement the same functionality as the vehicle perception component, and/or may comprise the same models as implemented by the vehicle perception component, but executed on the computing device(s) 100 rather than in a vehicle.

As used herein, a vehicle perception component may be a component of a vehicle control system (e.g., for an autonomous vehicle), configured to generate perception data based on sensor data recorded by one or more sensors of the vehicle, such as camera images. The vehicle perception component may detect object(s) in in the environment surrounding the vehicle (e.g., identify that an object exists), classify the object(s) (e.g., determine an object type associated with a detected object), segment sensor data and/or other representations of the environment (e.g., identify a portion of the sensor data and/or representation of the environment as being associated with a detected object and/or an object type), determine characteristics associated with an object (e.g., a track identifying current, predicted, and/or previous position, heading, velocity, and/or acceleration associated with an object), and/or the like, and may output perception data associated with the same.

Thus, when provided with the second processed image from image processor 116, the perception component 120 may attempt to identify or classify one or more objects, or characteristics thereof, in the second processed image, reflecting the behavior of a vehicle perception component when presented with the same image. In particular, the perception component 120 may detect, identify, and/or classify the first object from the first raw image 112, as now represented in the second processed image. The characteristic may in some examples comprise one or more a numerosity of multiple objects detected, a bounding box associated with the object, a classification associated with the object, a detection (e.g., presence) of the object in the data, a semantic segmentation of the object, or any other characteristic represented in the data. In this way, the ability of the perception component 120 to recognize the first object (and any other labelled objects) in a processed image generated based at least in part on the first image processor setting(s) 106 may be determined.

Operation 218 may comprise determining, based at least in part on the first characteristic or classification of the first object (as determined by the perception component 120) and the label associated with the first object, a first object score. In the example illustrated in FIG. 1, operation 218 may be performed or represented by scorer 118. Scorer 118 may generate a score representing the ability of the perception component 120 to correctly identify/classify the first object or a property of the first object (and any other labelled objects) in the second processed image. Any suitable object score may be used, for example a loss score based on a probability of the classification determined by the perception module 120, such as a cross-entropy loss. The object score may be associated with a detection, classification, position, size, orientation of the object or the characteristic of the object. The object score may be based at least in part on any computer vision performance metric, such as precision, recall, F1 score, etc. In general, the object score may be any score representing a difference between the second processed image and a ground truth. Optimizing image processors settings based on an object score may be particularly relevant for cameras used in vehicles, where correctly detecting, classifying, and localizing objects such as other vehicles and pedestrians may be important for safe operation of the vehicle.

In some examples, the object score may be used only to test the first image processor setting(s) 106, for example determining if the object score meets a predetermined threshold. If the object score meets the predetermined threshold, the first image processor setting(s) 106 may be transmitted to the vehicle. In other examples however, such as in the illustrated example, the object score may be used to refine the first image processor setting(s) in a second optimization process.

Thus, operation 218 may comprise optimizing, based at least in part on the first object score, the first image processor setting(s). Optimizing may for example comprise, iteratively: determining an updated value of the first image processor setting(s) 106 based at least in part on the object score; generating an updated second processed image from the image processor 116 (e.g., with the same output from the camera emulator 110 as previously) with the image processor 116 configured based at least in part on the updated value of the first image processor setting(s) 106; determining an updated object score from a determining a characteristic or classification of the first object in the the updated second processed image by the perception component 120; and determining a further updated value of the first image processor setting(s) 106 based at least in part on the updated object score. These steps may be repeated until a stop condition is met, for example a stop condition associated with the object score. In some examples, the stop condition may be met if the object score meets a predetermined threshold value. In some examples, optimizing may comprise performing a convex optimization algorithm, using the object score as the cost function to be optimized.

In some examples, multiple image processor settings may be determined. The image processor settings may be optimized together in operation 218. In some examples, the image processor setting(s) may be optimized based at least in part on a plurality of raw images. The image processor setting(s) may be optimized on the plurality of raw images at the same time, i.e., the object score may represent a combined score based on the plurality of raw images.

Once optimized by the first and/or second optimization processes, the first image processor setting(s) 106 may be transmitted to a vehicle 156 (or fleet of vehicles 156). Vehicle 156 may be an autonomous or semi-autonomous vehicle. Thus, process 200 may comprise operation 220 comprising transmitting the first image processor setting(s) 106 to a vehicle camera of a vehicle 156 (e.g., as part of, or to update, a look-up table or other datastore associating image processor settings with ambient light conditions). The vehicle 156 may be controlled based at least in part on an ambient light detection associated with an environment through which the vehicle is traversing. The ambient light detection may be based at least in part on one or more of: a sensor of the vehicle (e.g., an onboard spectrometer), a time of year, a time of day, a location of the vehicle, current weather conditions, and the like. For example, control systems of the vehicle may configure an image processor of or associated with the vehicle camera based at least in part on the first image processor setting(s) 106 and the ambient light detection. Processed images generated by the vehicle camera representing the environment surrounding the vehicle may be passed to a vehicle perception component, which may identify/classify objects around the vehicle from the image. The perception component may output this information as perception data, which may be passed to a prediction and/or planning component of the vehicle control systems, which may determine a trajectory for the vehicle to move through the environment based at least in part on the objects identified/classified by the perception component.

As discussed above, the first image processor setting(s) 106 may be generated based at least in part on a test image illuminated according to a first light setting. The first light setting may represent a first ambient light condition that may be experienced by a vehicle, such as a sunrise, sunset, sun conditions at other times of day, for example at a particular location. The vehicle 156 may configure its vehicle camera(s) according to the first image processor setting(s) 106 when current light conditions match (or approximate to or are otherwise associated with) the ambient light condition associated with the first light setting. In some examples, different image processor setting(s) 106 may be determined for each of a plurality of light conditions. For example, the vehicle 156 may store a look-up table or other data store associating respective light conditions with respective image processor setting(s) 106. The vehicle 156 may determine a current light condition and find a matching (or closest matching) light condition in the look-up table, and may implement the associated image processor setting(s). Thus, the vehicle camera may be dynamically configured for the actual ambient light conditions experienced by the vehicle 156. This may improve the quality of images generated by the vehicle camera, and hence improve the quality of information extracted from the images by the vehicle perception module, which in turn may improve planning decisions for navigating the vehicle safely through the environment.

Figure 3:
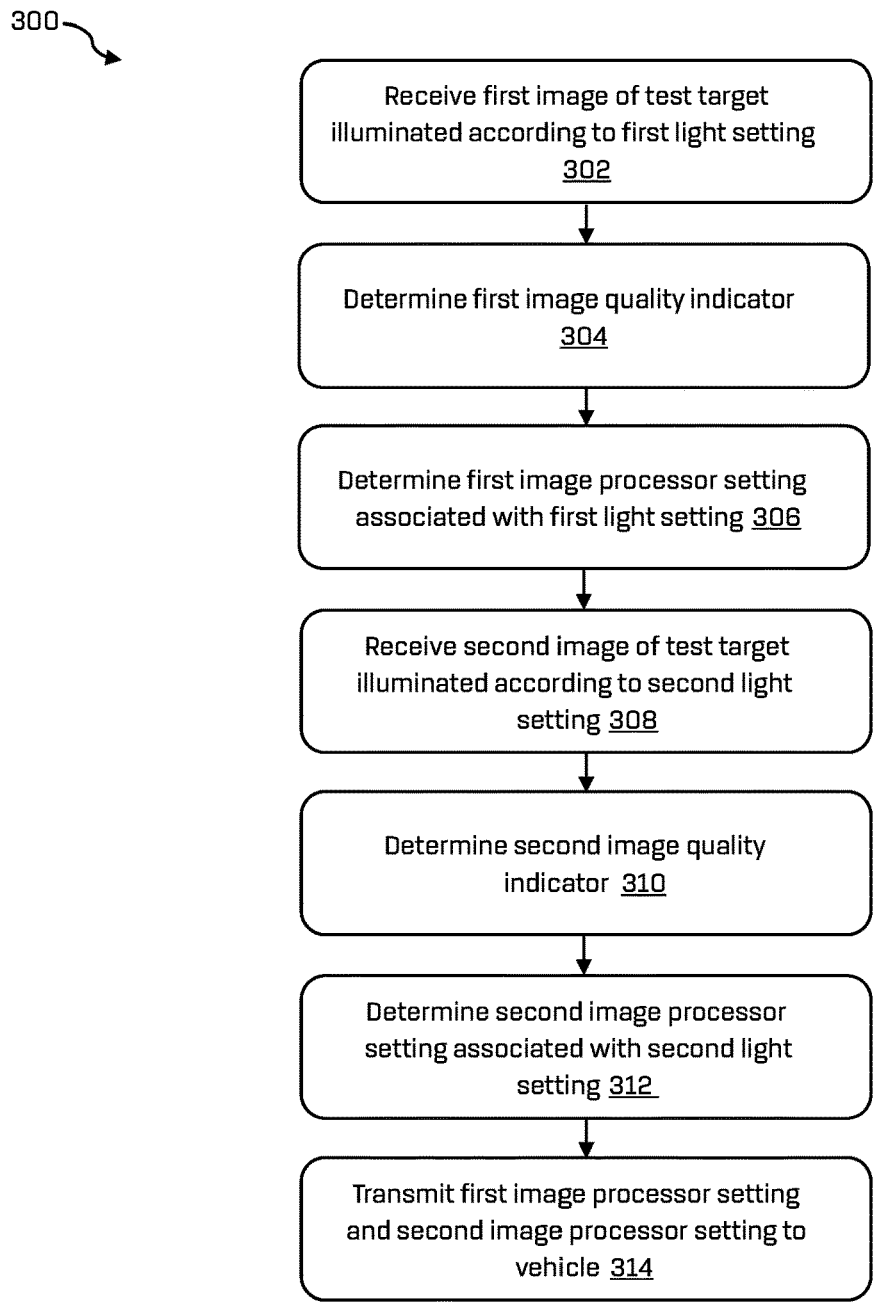
FIG. 3 is a flow chart illustrating an example a process according to techniques of the present disclosure.

FIG. 3 illustrates an example process 300 in which different image processor settings are determined for two different light settings, representing two different ambient light conditions that may be experienced by a vehicle such as vehicle 156. Process 300 may be implemented by the system illustrated in FIG. 1, and in particular by computing device(s) 100. In general, process 300 may be implemented on a system comprising one or more processors and one or more non-transitory computer-readable media storing instructions that, when executed, perform the operations of process 300. Process 300 may be implemented as one or more transitory or non-transitory computer-readable media storing instructions executable by one or more processors, wherein the instructions, when executed, cause the one or more processors to perform the operations of process 300. Process 300 may be implemented as a computer program comprising instructions which, when executed by a computer device, cause the computer device to perform the operations of process 300.

Process 300 may comprise operation 302, comprising receiving a first image 104 of a camera test target 152, the first image 104 from (e.g., captured by) a test camera 154 while the camera test target 152 is illuminated according to a first light setting (e.g., by lighting system 150) associated with a first ambient light condition experienced by a vehicle (e.g., vehicle 156) traversing an environment. Operation 302 may be the similar to operation 202 described above. In some examples process 300 may comprise an initial operation of illuminating the camera test target 152 according to the first light setting.

Process 300 may comprise operation 304, comprising determining, based at least in part on the first image 104 and on a known characteristic of the camera test target 152, a first image quality indicator. Operation 304 may be the similar to operation 204 described above.

Process 300 may comprise operation 306, comprising determining, based at least in part on the first image quality indicator, a first image processor setting 106 associated with the first light setting. Determining the first image processor setting 106 may comprise optimizing the first image processor setting 106, for example as described in relation to operation 206 described above. Determining the first image processor setting 106 may comprise first optimizing the first image processor setting 106 by the first optimizer 102, and then further optimizing the first image processor setting 106 by the second optimizer 108. In other words, operation 306 may comprise operation 206 and/or operations 208-218 of process 200 described above. As discussed above, a plurality of first image processor settings 106 may be determined for the first light setting, for example each relating to a different image property.

Process 300 may comprise operation 308, comprising receiving a second (processed) image 104 of the camera test target 152, the second image 104 from (e.g., captured by) the test camera 154 while the camera test target 152 is illuminated according to a second light setting (e.g., by lighting system 150) associated with a second ambient light condition experienced by the vehicle traversing the environment. Operation 308 may be similar to operation 302, except with illumination based on the second light setting rather than the first light setting. In some examples operation 308 may comprise an initial operation of illuminating the camera test target 152 according to the second light setting. In various examples, a single image may be displayed with a particular frequency to mimic input from a video feed. Additionally, or alternatively, multiple images may be used. Regardless, output from the repeated single image or diverse images may be used in the process below for determination of the light settings, whether individually or otherwise aggregated (e.g., averaged).

Process 300 may comprise operation 310, comprising determining, based at least in part on the second image 104 and on a known characteristic of the camera test target 152, a second image quality indicator. Operation 310 may be similar to operation 304, except with illumination based on the second light setting rather than the first light setting.

Process 300 may comprise operation 312, comprising determining, based at least in part on the second image quality indicator, a second image processor setting 106 associated with the second light setting. Operation 312 may be similar to operation 306, except with illumination based on the second light setting rather than the first light setting. In particular, operation 312 may comprise optimizing the second image processor setting 106, for example by performing operation 206 and/or operations 210-218 of process 200 described above (but with illumination according to the second light setting).

Process 300 may comprise operation 314, comprising transmitting the first image processor setting(s) 106 and the second image processor setting(s) 106 to the vehicle 156. The vehicle 156 may be controlled based at least in part on an ambient light detection associated with the environment through which the vehicle is traversing being associated with the first light setting or the second light setting. For example, if the ambient light condition is associated with (e.g., matches, or approximates to) the first lighting condition, the vehicle may be controlled based at least in part on the first image processor setting. In particular, the first image processor setting may be applied to an image processor onboard the vehicle 156. The vehicle 156 may be controlled based at least in part on images from a vehicle camera configured according to the first image processor setting(s) 106 or the second image processor setting(s) 106 based at least in part on the ambient light detection is associated with the first light setting or the second light setting. The ambient light detection may be actively detected by a sensor (e.g., an onboard spectrometer) of the vehicle, or may be determined based at least in part on a time of day, time of year, and/or location of the vehicle, for example by comparing the current time/location to a database of light conditions indexed according to time and/or location.

In some examples, the vehicle may be controlled (e.g., setting(s) of an image processor) may be set based on an interpolation between image processor settings determined according to process 200 or process 300. For example, the ambient light detection may have light properties that are between the first ambient light condition (associated with the first image processor setting) and the second ambient light condition (associated with the second image processor setting). For example, the ambient light detection may have light conditions that are between the first ambient light condition and second ambient light condition. An interpolated image processor setting may be determined based at least in part on the first image processor setting, the second image processor setting, the ambient light detection, and a difference between the first ambient light condition and the second ambient light condition (e.g., by parameterizing the first and second ambient light conditions according to one or more frequency groupings).

Some examples of process 300 may comprise identifying the first and second light setting. For example, first and second light conditions may be identified from a set of light conditions, e.g. based at least in part on clustering as described above. Process 300 may comprise determining a light setting corresponding to each light condition, the light setting determined to control an illumination system 150 to generate illumination associated with (e.g. approximating the spectrum of) the corresponding light condition.

Figure 4:
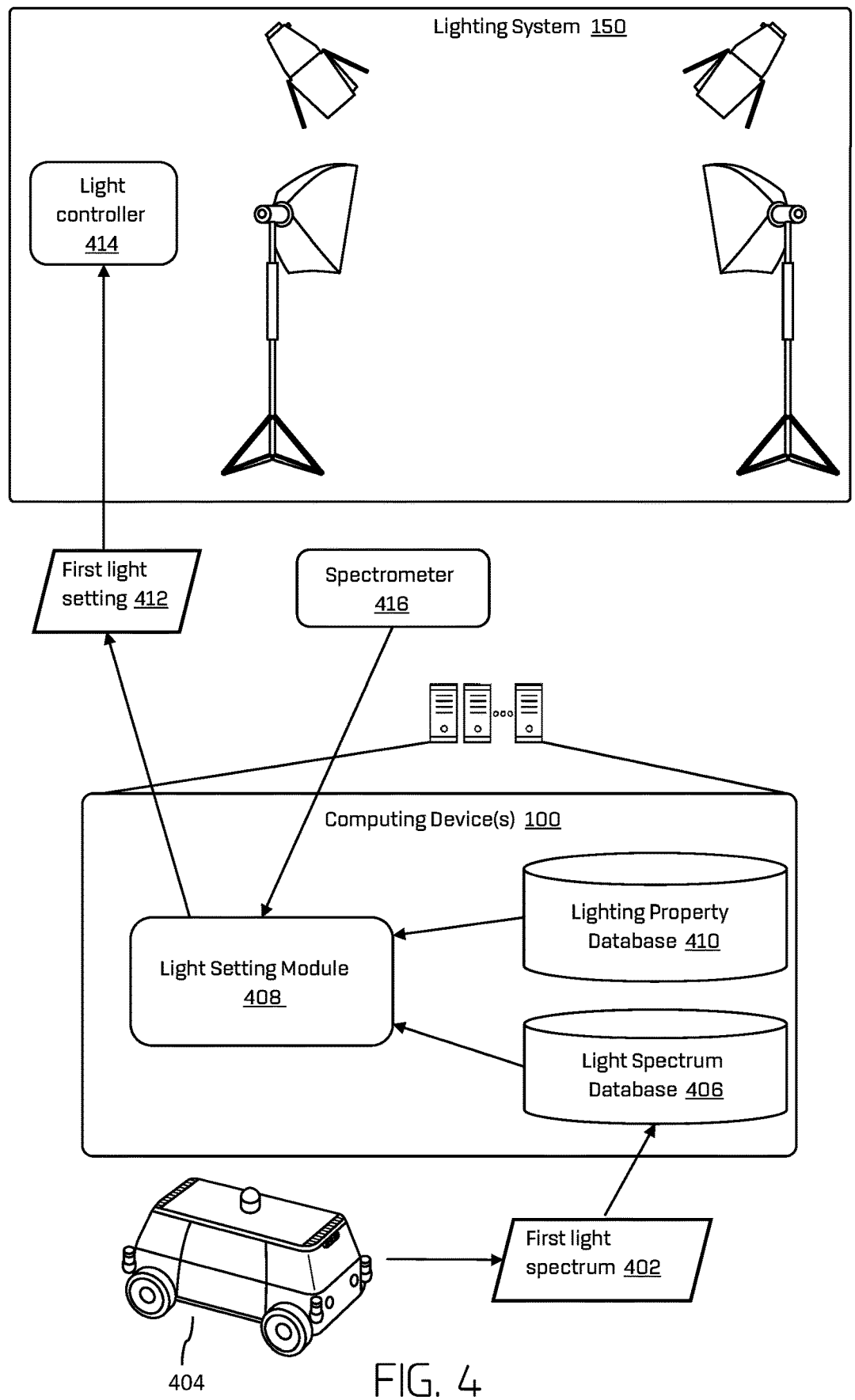
FIG. 4 illustrates a system for controlling a lighting system.

FIG. 4 illustrates an example system for controlling a lighting system 150 to illuminate a test target 152 to match a desired light condition. In the illustrated example, a first light spectrum 402 may be received representing a first ambient light condition experienced by a vehicle 404 (which may or may not be the same as vehicle 156). For example, a sensor such as a spectrometer of the vehicle 404 may detect a spectrum representing a real-world ambient light condition experienced by the vehicle 404. The first light spectrum may be transmitted to a computing device(s) 100 remote from the vehicle 404, and may for example be stored in a light spectrum database 406. A light setting module 408 (which may represent logical blocks of software implemented on computing device(s) 100) receive the first light spectrum 402 from the light spectrum database 406 (for example, based on a user selection of the first light spectrum 402 for testing, or based an automated determination to test the first light spectrum 402). The light setting module 408 may further receive information relating to the lighting system 150, for example from a lighting property database 410. For example, the information relating to the lighting system 150 may specify properties of individual light sources of the lighting system 150, such as output spectra of the light sources. The light setting module 408 may determined, based at least in part on the first light spectrum 402 and the output spectra of the light sources of the lighting system 150, a first light setting 412. For example, the first light setting 412 may specify a power or output intensity for each of the light sources in order to recreate the first light spectrum 402 using the illumination system 150. The first light setting 412 may be provided to a light controller 414 of the lighting system 150, which may control the light sources according to the first light setting 412. In some examples, a spectrometer 416 may be used to dynamically stabilize the illumination provided by the lighting system 150. For example, the spectrometer 416 may detect the spectrum of light emitted by the lighting system, and provide the spectrum to the light setting module 408, which may adjust the first light setting based at least in part on the detected spectrum.

Figure 5:
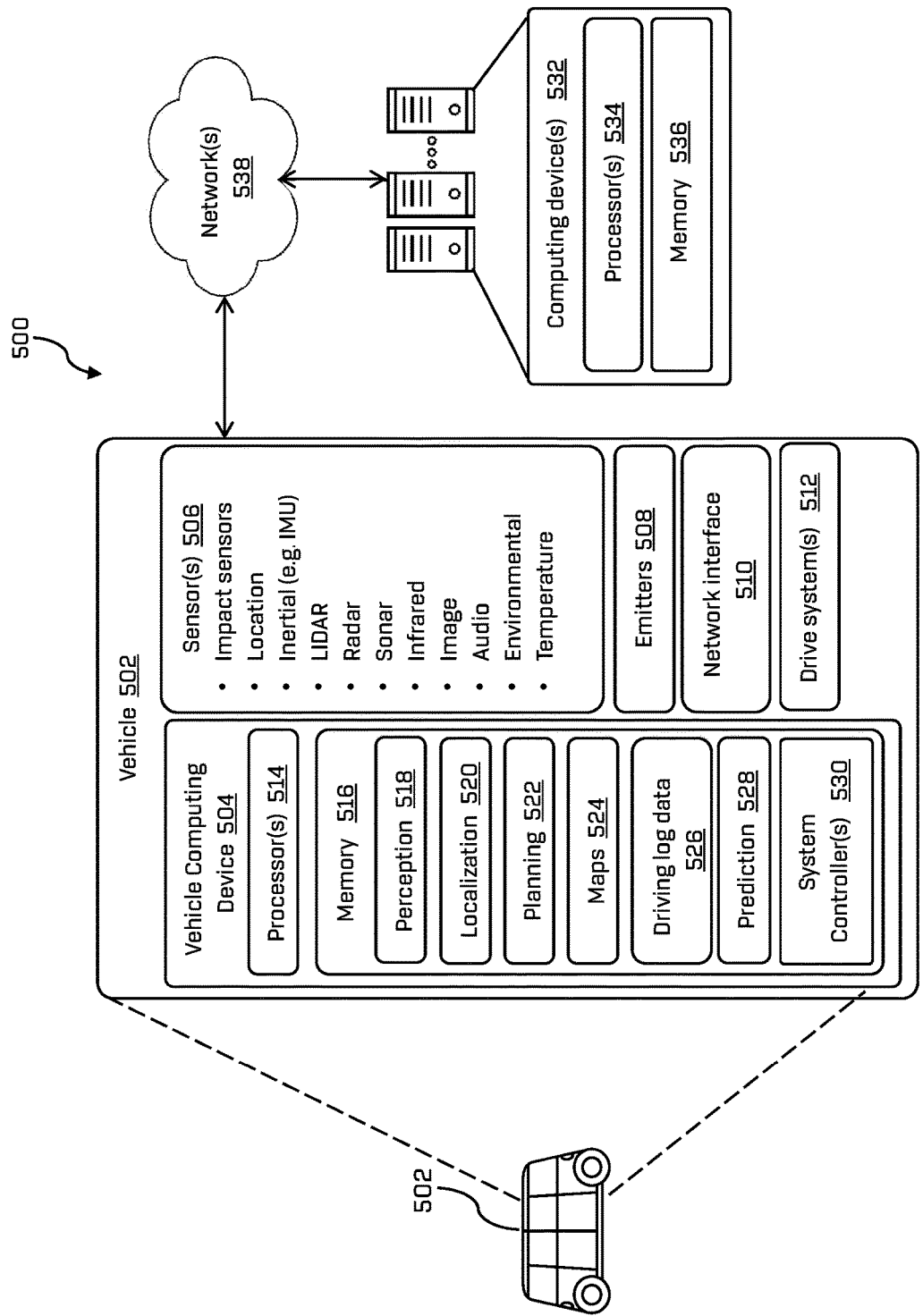
FIG. 5 a block diagram illustrating an example vehicle system and associated computing device(s) according to the present invention.

FIG. 5 illustrates a block diagram of an example system 500 that may implement the techniques discussed herein. In some instances, the example system 500 may include a vehicle 502. In some instances, the vehicle 502 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 502 may be a fully or partially autonomous vehicle having any other level or classification. Moreover, in some instances, the techniques described herein may be usable by non-autonomous vehicles as well. The vehicles 156 and/or 404 illustrated in FIG. 1 and FIG. 4 may be examples of vehicles 502.

The vehicle 502 may include a vehicle computing device(s) 504, sensor(s) 506, emitter(s) 508, network interface(s) 510, and/or drive system(s) 512. Sensor(s) 506 may represent sensor(s) 112. The system 500 may additionally or alternatively comprise computing device(s) 532. Computing device(s) 532 may be, or may comprise, computing device(s) 100 described above.

In some instances, the sensor(s) 506 may include lidar sensors, radar sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), image sensors (e.g., red-green-blue (RGB), infrared (IR), intensity, depth, time of flight cameras, etc.), microphones, wheel encoders, environment sensors (e.g., thermometer, hygrometer, light sensors, pressure sensors, etc.), etc. The sensor(s) 506 may include multiple instances of each of these or other types of sensors. For instance, the radar sensors may include individual radar sensors located at the corners, front, back, sides, and/or top of the vehicle 502. As another example, the cameras may include multiple cameras disposed at various locations about the exterior and/or interior of the vehicle 502. The sensor(s) 506 may provide input to the vehicle computing device(s) 504 and/or to computing device(s) 532. The vehicle camera(s) described above may be part of sensors 506.

The vehicle 502 may also include emitter(s) 508 for emitting light and/or sound, as described above. The emitter(s) 508 may include interior audio and visual emitter(s) to communicate with passengers of the vehicle 502. Interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 508 may also include exterior emitter(s). Exterior emitter(s) may include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 502 may also include network interface(s) 510 that enable communication between the vehicle 502 and one or more other local or remote computing device(s). The network interface(s) 510 may facilitate communication with other local computing device(s) on the vehicle 502 and/or the drive component(s) 512. The network interface(s) 510 may additionally or alternatively allow the vehicle to communicate with other nearby computing device(s) (e.g., other nearby vehicles, traffic signals, etc.). The network interface(s) 510 may additionally or alternatively enable the vehicle 502 to communicate with computing device(s) 532 over a network 538. In some examples, computing device(s) 532 may comprise one or more nodes of a distributed computing system (e.g., a cloud computing architecture).

The vehicle 502 may include one or more drive components 512. In some instances, the vehicle 502 may have a single drive component 512. In some instances, the drive component(s) 512 may include one or more sensors to detect conditions of the drive component(s) 512 and/or the surroundings of the vehicle 502. By way of example and not limitation, the sensor(s) of the drive component(s) 512 may include one or more wheel encoders (e.g., rotary encoders) to sense rotation of the wheels of the drive components, inertial sensors (e.g., inertial measurement units, accelerometers, gyroscopes, magnetometers, etc.) to measure orientation and acceleration of the drive component, cameras or other image sensors, ultrasonic sensors to acoustically detect objects in the surroundings of the drive component, lidar sensors, radar sensors, etc. Some sensors, such as the wheel encoders may be unique to the drive component(s) 512. In some cases, the sensor(s) on the drive component(s) 512 may overlap or supplement corresponding systems of the vehicle 502 (e.g., sensor(s) 506).

The drive component(s) 512 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive component(s) 512 may include a drive component controller which may receive and preprocess data from the sensor(s) and to control operation of the various vehicle systems. In some instances, the drive component controller may include one or more processors and memory communicatively coupled with the one or more processors. The memory may store one or more components to perform various functionalities of the drive component(s) 512. Furthermore, the drive component(s) 512 may also include one or more communication connection(s) that enable communication by the respective drive component with one or more other local or remote computing device(s).

The vehicle computing device(s) 504 may include processor(s) 514 and memory 516 communicatively coupled with the one or more processors 514. Computing device(s) 532 may also include processor(s) 534, and/or memory 536. The processor(s) 514 and/or 534 may be any suitable processor capable of executing instructions to process data and perform operations as described herein. By way of example and not limitation, the processor(s) 514 and/or 534 may comprise one or more central processing units (CPUs), graphics processing units (GPUs), integrated circuits (e.g., application-specific integrated circuits (ASICs)), gate arrays (e.g., field-programmable gate arrays (FPGAs)), and/or any other device or portion of a device that processes electronic data to transform that electronic data into other electronic data that may be stored in registers and/or memory.

Memory 516 and/or 536 may be examples of non-transitory computer-readable media. The memory 516 and/or 536 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 516 and/or memory 536 may store a perception component 518, localization component 520, planning component 522, map(s) 524, driving log data 526, prediction component 528, tracker component and/or system controller(s) 530—zero or more portions of any of which may be hardware, such as GPU(s), CPU(s), and/or other processing units.

The perception component 518 may detect object(s) in in an environment surrounding the vehicle 502 (e.g., identify that an object exists), classify the object(s) (e.g., determine an object type associated with a detected object), segment sensor data and/or other representations of the environment (e.g., identify a portion of the sensor data and/or representation of the environment as being associated with a detected object and/or an object type), determine characteristics associated with an object (e.g., a track identifying current, predicted, and/or previous position, heading, velocity, and/or acceleration associated with an object), and/or the like. Data determined by the perception component 518 is referred to as perception data. The perception component 518 may be configured to associate a bounding region (or other indication) with an identified object. The perception component 518 may be configured to associate a confidence score associated with a classification of the identified object with an identified object. In some examples, objects, when rendered via a display, can be colored based on their perceived class. The object classifications determined by the perception component 518 may distinguish between different object types such as, for example, a passenger vehicle, a pedestrian, a bicyclist, motorist, a delivery truck, a semi-truck, traffic signage, and/or the like. The perception component 518 may be an example of a vehicle perception component as discussed above, whose functions the perception component 120 replicates.

In at least one example, the localization component 520 may include hardware and/or software to receive data from the sensor(s) 506 to determine a position, velocity, and/or orientation of the vehicle 502 (e.g., one or more of an x-, y-, z-position, roll, pitch, or yaw). For example, the localization component 520 may include and/or request/receive map(s) 524 of an environment and can continuously determine a location, velocity, and/or orientation of the autonomous vehicle 502 within the map(s) 524. In some instances, the localization component 520 may utilize SLAM (simultaneous localization and mapping), CLAMS (calibration, localization and mapping, simultaneously), relative SLAM, bundle adjustment, non-linear least squares optimization, and/or the like to receive image data, lidar data, radar data, IMU data, GPS data, wheel encoder data, and the like to accurately determine a location, pose, and/or velocity of the autonomous vehicle. In some instances, the localization component 520 may provide data to various components of the vehicle 502 to determine an initial position of an autonomous vehicle for generating a trajectory and/or for generating map data, as discussed herein. In some examples, localization component 520 may provide, to the perception component 518, a location and/or orientation of the vehicle 502 relative to the environment and/or sensor data associated therewith.

The planning component 522 may receive a location and/or orientation of the vehicle 502 from the localization component 520 and/or perception data from the perception component 518 and may determine instructions for controlling operation of the vehicle 502 based at least in part on any of this data. In some examples, determining the instructions may comprise determining the instructions based at least in part on a format associated with a system with which the instructions are associated (e.g., first instructions for controlling motion of the autonomous vehicle may be formatted in a first format of messages and/or signals (e.g., analog, digital, pneumatic, kinematic) that the system controller(s) 530 and/or drive component(s) 512 may parse/cause to be carried out, second instructions for the emitter(s) 508 may be formatted according to a second format associated therewith).

The driving log data 526 may comprise sensor data, perception data, and/or scenario labels collected/determined by the vehicle 502 (e.g., by the perception component 518), as well as any other message generated and or sent by the vehicle 502 during operation including, but not limited to, control messages, error messages, etc. In some examples, the vehicle 502 may transmit the driving log data 526 to the computing device(s) 532. The computing device(s) 532 may identify one or more scenarios based at least in part on the log data, which may also comprise defining a scenario, wherein the scenarios are used to generate a playback simulation. For example, the computing device(s) 532 may determine an environmental layout, a number, type, and a configuration of object(s) in the environment and/or associate this definition with one or more portions of log data associated with that scenario. In some examples, the driving log data 526 may comprise (historical) perception data that was generated on the vehicle 502 during operation of the vehicle.

The prediction component 528 may generate one or more probability maps representing prediction probabilities of possible locations of one or more objects in an environment. For example, the prediction component 528 may generate one or more probability maps for vehicles, pedestrians, animals, and the like within a threshold distance from the vehicle 502. In some examples, the prediction component 528 may measure a track of an object and generate a discretized prediction probability map, a heat map, a probability distribution, a discretized probability distribution, and/or a trajectory for the object based on observed and predicted behavior. In some examples, the one or more probability maps may represent an intent of the one or more objects in the environment. In some examples, the planning component 522 may be communicatively coupled to the prediction component 528 to generate predicted trajectories of objects in an environment. For example, the prediction component 528 may generate one or more predicted trajectories for objects within a threshold distance from the vehicle 502. In some examples, the prediction component 528 may measure a trace of an object and generate a trajectory for the object based on observed and predicted behavior. Although prediction component 528 is shown on a vehicle 502 in this example, the prediction component 528 may also be provided elsewhere, such as in a remote computing device as shown in FIG. 5. In some embodiments, a prediction component may be provided at both a vehicle and a remote computing device. These components may be configured to operate according to the same or a similar algorithm.

The memory 516 and/or 536 may additionally or alternatively store a mapping system, a planning system, a ride management system, etc. Although perception component 518 and/or planning component 522 are illustrated as being stored in memory 516, perception component 518 and/or planning component 522 may include processor-executable instructions, machine-learned model(s) (e.g., a neural network), and/or hardware.

As described herein, the localization component 520, the perception component 518, the planning component 522, the prediction component 528, and/or other components of the system 500 may comprise one or more ML models. For example, the localization component 520, the perception component 518, the planning component 522, and/or the planning component 528 may each comprise different ML model pipelines. In some examples, an ML model may comprise a neural network. An exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine-learning, which can refer to a broad class of such algorithms in which an output is generated based on learned parameters.

Although discussed in the context of neural networks, any type of machine-learning can be used consistent with this disclosure. For example, machine-learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAD)), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet-50, ResNet-101, VGG, DenseNet, PointNet, and the like. In some examples, the ML model discussed herein may comprise PointPillars, SECOND, top-down feature layers (e.g., see U.S. patent application Ser. No. 15/963,833, which is incorporated in its entirety herein), and/or VoxelNet. Architecture latency optimizations may include MobilenetV2, Shufflenet, Channelnet, Peleenet, and/or the like. The ML model may comprise a residual block such as Pixor, in some examples.

Memory 520 may additionally or alternatively store one or more system controller(s) 530, which may be configured to control steering, propulsion, braking, safety, emitters, communication, and other systems of the vehicle 502. These system controller(s) 530 may communicate with and/or control corresponding systems of the drive component(s) 512 and/or other components of the vehicle 502.

It should be noted that while FIG. 5 is illustrated as a distributed system, in alternative examples, components of the vehicle 502 may be associated with the computing device(s) 532 and/or components of the computing device(s) 532 may be associated with the vehicle 502. That is, the vehicle 502 may perform one or more of the functions associated with the computing device(s) 532, and vice versa.

EXAMPLE CLAUSES

A: A system comprising one or more processors; and one or more non-transitory computer-readable media storing instructions that, when executed, cause the system to perform operations comprising: illuminating a camera test target according to a first light setting; receiving a first processed image of the camera test target from a test camera; determining, based at least in part on the first processed image and on a known characteristic of the camera test target, a first image quality indicator; optimizing, based at least in part on the first image quality indicator, a first image processor setting associated with the test camera; receiving a first raw image, the first raw image comprising a first object; generating, using an image processor configured based at least in part on the first image processor setting and the first raw image, a second processed image; determining, using a perception component associated with a vehicle control system, a first characteristic of the first object in the second processed image; determining, based at least in part on the first characteristic of the first object and a predetermined label associated with the first object, a first object score; optimizing, based at least in part on the first object score, the first image processor setting; and transmitting the first image processor setting to a vehicle camera of a vehicle configured to be controlled based at least in part on an ambient lighting detection associated with an environment through which the vehicle is traversing.

B: The system of clause A, wherein the ambient lighting detection is based at least in part on one or more of: a sensor of the vehicle, a time of day, or a location of the vehicle.

C: The system of clause A or clause B, wherein the first image quality indicator comprises one or more of: a measure of glare, a contrast, a color accuracy, a sharpness, or a tonal response.

D: The system of any of clause A to C, wherein the first image processor setting is associated with one or more of: exposure, white balance, artificial image sharpening, contrast, saturation, noise reduction, vibrance, hue, gamma correction, or color balance.

E: A method comprising: illuminating a camera test target according to a first light setting associated with an ambient light condition experienced by a vehicle traversing an environment; receiving a first image of the camera test target from a test camera; determining, based at least in part on the first image and on a known characteristic of the camera test target, a first image quality indicator; determining, based at least in part on the first image quality indicator, a first image processor setting associated with the first light setting; illuminating the camera test target according to a second light setting associated with an ambient light condition experienced by a vehicle traversing an environment; receiving a second image of the camera test target from the test camera; determining, based at least in part on the second image and on a known characteristic of the camera test target, a second image quality indicator; determining, based at least in part on the second image quality indicator, a second image processor setting associated with the second light setting; and transmitting the first image processor setting and the second image processor setting to the vehicle, the vehicle controlled based at least in part on an ambient light detection associated with the environment through which the vehicle is traversing being associated with the first light setting or the second light setting.

F: The method of clause E, further comprising: receiving an additional image representing an object; generating, using an image processor configured based at least in part on the first image processor setting and the additional image, a processed image; providing the processed image to a perception component; and identifying, by the perception component, a characteristic of the object, wherein transmitting the first image processor setting to the vehicle based at least in part on identifying, by the perception component, the object.

G: The method of clause F, comprising updating a value of the first image processor setting based at least in part on identifying, by the perception component, the characteristic of object.

H: The method of clause F or clause G, further comprising determining a score based at least in part on the characteristic, and wherein the characteristic comprises one or more of: a number of additional objects detected, a classification of the object, a bounding box associated with the object, or a semantic segmentation of the object.

I: The method of any of clauses E to H, comprising iteratively: determining an updated value of the first image processor setting based at least in part on the first image quality indicator; receiving an updated first image captured based at least in part on the updated value of the first image processor setting; determining an updated first image quality indicator based at least in part on the updated first image; and determining a further updated value of the first image processor setting based at least in part on the updated first image quality indicator.

J: The method of any of clauses E to I, comprising: determining a respective set of image processor setting associated with a light setting of a set of light settings, the set of light settings comprising at least five light settings; and transmitting the set of image processor setting to the vehicle.

K: The method of any of clauses E to J, comprising: receiving a plurality of light spectra associated with ambient light conditions experienced by vehicles traversing multiple environments; identifying, using a clustering algorithm, a first cluster of light spectra and a second cluster of light spectra in the plurality of light spectra; and determining the first light setting and the second light setting based at least in part on the first cluster of light spectra and the second cluster of light spectra respectively.

L: The method of any of clauses E to K, wherein the first light setting or the second light setting is associated with one or more of: a time of day, a time of year, a geographical location, or a driving event.

M: The method of any of clauses E to L, wherein the first image quality indicator is associated with a weight, the method comprising determining the first image processor setting based at least in part on the weight associated with the first image quality indicator.

N: The method of any of clauses E to M, comprising: illuminating, by a lighting system, the camera test target according to the first light setting; measuring, by a spectrometer, a signal representing the light output by the lighting system; and associating the signal representing the light output with the first image processor setting.

O: One or more non-transitory computer-readable media storing instructions executable by one or more processors, wherein the instructions, when executed, cause the one or more processors to perform operations comprising: illuminating a camera test target according to a first light setting associated with an ambient light condition experienced by a vehicle traversing an environment; receiving a first image of the camera test target from a test camera; determining, based at least in part on the first image and on a known characteristic of the camera test target, a first image quality indicator; determining, based at least in part on the first image quality indicator, a first image processor setting associated with the first light setting; illuminating the camera test target according to a second light setting associated with an ambient light condition experienced by a vehicle traversing an environment; receiving a second image of the camera test target from the test camera; receiving a second image of the camera test target, the second image captured by the test camera while the camera test target is illuminated according to a second light setting associated with a second ambient light condition experienced by the vehicle traversing the environment; determining, based at least in part on the second image and on a known characteristic of the camera test target, a second image quality indicator; determining, based at least in part on the second image quality indicator, a second image processor setting associated with the second light setting; and transmitting the first image processor setting and the second image processor setting to the vehicle, the vehicle controlled based at least in part on an ambient light detection associated with the environment through which the vehicle is traversing being associated with the first light setting or the second light setting.

P: The one or more non-transitory computer-readable media of clause O, the operations comprising: determining a first set of image processor settings based at least in part on the first image and a second set of image processor settings based at least in part on the second image; and transmitting the first set of image processor settings and the second set of image processor settings to the vehicle.

Q: The one or more non-transitory computer-readable media of clause O or clause P, wherein the camera test target comprises one or more regions having known optical characteristics, each region associated with one or more image quality indicators.

R: The one or more non-transitory computer-readable media of any of clauses O to Q, wherein the first image quality indicator or the second image quality indicator is or comprises one or more of: a measure of glare, a contrast, a color accuracy, a sharpness, or a tonal response.

S: The one or more non-transitory computer-readable media of any of clauses O to R, wherein the first image processor setting or the second image processor setting is associated with one or more of: exposure, white balance, artificial image sharpening, contrast, saturation, noise reduction, vibrance, hue, gamma correction, or color balance.

T: The one or more non-transitory computer-readable media of any of clauses O to S, the operations comprising receiving, from a sensor on a vehicle, a representation of the first ambient light condition or the second ambient light condition.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations, and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into subcomputations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

At least some of the processes discussed herein are illustrated as logical flow charts, each operation of which represents a sequence of operations that can be implemented in hardware, software, or a combination thereof. In the context of software, the operations represent computer-executable instructions stored on one or more non-transitory computer-readable storage media that, when executed by one or more processors, cause a computer or autonomous vehicle to perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art. Note that the term substantially may indicate a range. For example, substantially simultaneously may indicate that two activities occur within a time range of each other, substantially a same dimension may indicate that two elements have dimensions within a range of each other, and/or the like.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:
   one or more processors; and
   one or more non-transitory computer-readable media storing instructions that, when executed, cause the system to perform operations comprising:
      illuminating a camera test target according to a first light setting;
      receiving a first processed image of the camera test target from a test camera;
      determining, based at least in part on the first processed image and on a known characteristic of the camera test target, a first image quality indicator;
      optimizing, based at least in part on the first image quality indicator, a first image processor setting associated with the test camera;
      receiving a first raw image, the first raw image comprising a first object;
      generating, using an image processor configured based at least in part on the first image processor setting and the first raw image, a second processed image;
      determining, using a perception component associated with a vehicle control system, a first characteristic of the first object in the second processed image;
      determining, based at least in part on the first characteristic of the first object and a predetermined label associated with the first object, a first object score;
      optimizing, based at least in part on the first object score, the first image processor setting; and
      transmitting the first image processor setting to a vehicle camera of a vehicle configured to be controlled based at least in part on an ambient lighting detection associated with an environment through which the vehicle is traversing.

2. The system of claim 1, wherein the ambient lighting detection is based at least in part on one or more of:
   a sensor of the vehicle,
   a time of day, or
   a location of the vehicle.

3. The system of claim 1, wherein the first image quality indicator comprises one or more of: a measure of glare, a contrast, a color accuracy, a sharpness, or a tonal response.

4. The system of claim 1, wherein the first image processor setting is associated with one or more of: exposure, white balance, artificial image sharpening, contrast, saturation, noise reduction, vibrance, hue, gamma correction, or color balance.

5. A method comprising:
   illuminating a camera test target according to a first light setting associated with an ambient light condition experienced by a vehicle traversing an environment;
   receiving a first image of the camera test target from a test camera;
   determining, based at least in part on the first image and on a known characteristic of the camera test target, a first image quality indicator;
   determining, based at least in part on the first image quality indicator, a first image processor setting associated with the first light setting;
   illuminating the camera test target according to a second light setting associated with an ambient light condition experienced by a vehicle traversing an environment;
   receiving a second image of the camera test target from the test camera;
   determining, based at least in part on the second image and on a known characteristic of the camera test target, a second image quality indicator;
   determining, based at least in part on the second image quality indicator, a second image processor setting associated with the second light setting; and
   transmitting the first image processor setting and the second image processor setting to the vehicle, the vehicle controlled based at least in part on an ambient light detection associated with the environment through which the vehicle is traversing being associated with the first light setting or the second light setting.

6. The method of claim 5, further comprising:
   receiving an additional image representing an object;
   generating, using an image processor configured based at least in part on the first image processor setting and the additional image, a processed image;
   providing the processed image to a perception component; and
   identifying, by the perception component, a characteristic of the object,
   wherein transmitting the first image processor setting to the vehicle based at least in part on identifying, by the perception component, the object.

7. The method of claim 6, comprising updating a value of the first image processor setting based at least in part on identifying, by the perception component, the characteristic of object.

8. The method of claim 6, further comprising determining a score based at least in part on the characteristic, and
   wherein the characteristic comprises one or more of:
      a number of additional objects detected,
      a classification of the object,
      a bounding box associated with the object, or
      a semantic segmentation of the object.

9. The method of claim 5, comprising iteratively:
   determining an updated value of the first image processor setting based at least in part on the first image quality indicator;
   receiving an updated first image captured based at least in part on the updated value of the first image processor setting;
   determining an updated first image quality indicator based at least in part on the updated first image; and
   determining a further updated value of the first image processor setting based at least in part on the updated first image quality indicator.

10. The method of claim 5, comprising:
    determining a respective set of image processor setting associated with a light setting of a set of light settings, the set of light settings comprising at least five light settings; and
    transmitting the set of image processor setting to the vehicle.

11. The method of claim 5, comprising:
    receiving a plurality of light spectra associated with ambient light conditions experienced by vehicles traversing multiple environments;
    identifying, using a clustering algorithm, a first cluster of light spectra and a second cluster of light spectra in the plurality of light spectra; and
    determining the first light setting and the second light setting based at least in part on the first cluster of light spectra and the second cluster of light spectra respectively.

12. The method of claim 5, wherein the first light setting or the second light setting is associated with one or more of: a time of day, a time of year, a geographical location, or a driving event.

13. The method of claim 5, wherein the first image quality indicator is associated with a weight, the method comprising determining the first image processor setting based at least in part on the weight associated with the first image quality indicator.

14. The method of claim 5, comprising:
    illuminating, by a lighting system, the camera test target according to the first light setting;
    measuring, by a spectrometer, a signal representing the light output by the lighting system; and
    associating the signal representing the light output with the first image processor setting.

15. One or more non-transitory computer-readable media storing instructions executable by one or more processors, wherein the instructions, when executed, cause the one or more processors to perform operations comprising:
    illuminating a camera test target according to a first light setting associated with an ambient light condition experienced by a vehicle traversing an environment;
    receiving a first image of the camera test target from a test camera;
    determining, based at least in part on the first image and on a known characteristic of the camera test target, a first image quality indicator;
    determining, based at least in part on the first image quality indicator, a first image processor setting associated with the first light setting;
    illuminating the camera test target according to a second light setting associated with an ambient light condition experienced by a vehicle traversing an environment;
    receiving a second image of the camera test target, the second image captured by the test camera while the camera test target is illuminated according to a second light setting associated with a second ambient light condition experienced by the vehicle traversing the environment;
    determining, based at least in part on the second image and on a known characteristic of the camera test target, a second image quality indicator;

determining, based at least in part on the second image quality indicator, a second image processor setting associated with the second light setting; and transmitting the first image processor setting and the second image processor setting to the vehicle, the vehicle controlled based at least in part on an ambient light detection associated with the environment through which the vehicle is traversing being associated with the first light setting or the second light setting.

16. The one or more non-transitory computer-readable media of claim 15, the operations comprising:

determining a first set of image processor settings based at least in part on the first image and a second set of image processor settings based at least in part on the second image; and transmitting the first set of image processor settings and the second set of image processor settings to the vehicle.

17. The one or more non-transitory computer-readable media of claim 15, wherein the camera test target comprises one or more regions having known optical characteristics, each region associated with one or more image quality indicators.

18. The one or more non-transitory computer-readable media of claim 15, wherein the first image quality indicator or the second image quality indicator is or comprises one or more of: a measure of glare, a contrast, a color accuracy, a sharpness, or a tonal response.

19. The one or more non-transitory computer-readable media of claim 15, wherein the first image processor setting or the second image processor setting is associated with one or more of: exposure, white balance, artificial image sharpening, contrast, saturation, noise reduction, vibrance, hue, gamma correction, or color balance.

20. The one or more non-transitory computer-readable media of claim 15, the operations comprising receiving, from a sensor on a vehicle, a representation of the first ambient light condition or the second ambient light condition.

* * * * *